United States Patent
Lee et al.

(10) Patent No.: US 8,340,022 B2
(45) Date of Patent: Dec. 25, 2012

(54) WIRELESS LOCATION DETERMINATION SYSTEM AND METHOD

(75) Inventors: Soon Woo Lee, Suwon-si (KR); Young Jin Park, Anyang-si (KR); Kwan Ho Kim, Seoul (KR); Ji Myung Kang, Ansan-si (KR)

(73) Assignee: Korea Electrotechnology Research Institute, Changwon-Si (KR)

( * ) Notice: Subject to any disclaimer, the term of this patent is extended or adjusted under 35 U.S.C. 154(b) by 418 days.

(21) Appl. No.: 12/627,182

(22) Filed: Nov. 30, 2009

(65) Prior Publication Data

US 2011/0051608 A1  Mar. 3, 2011

(30) Foreign Application Priority Data

Aug. 25, 2009 (KR) .................. 10-2009-0078624

(51) Int. Cl.
*H04W 24/00* (2009.01)
(52) U.S. Cl. .............. 370/328; 370/350; 455/456.1
(58) Field of Classification Search .............. 370/252, 370/328, 350; 455/456.1, 456.5
See application file for complete search history.

(56) References Cited

U.S. PATENT DOCUMENTS

| | | | | |
|---|---|---|---|---|
| 6,526,283 | B1 * | 2/2003 | Jang ........................ | 455/456.5 |
| 6,671,310 | B1 | 12/2003 | Richards | |
| 6,989,751 | B2 | 1/2006 | Richards | |
| 2004/0166877 | A1 * | 8/2004 | Spain et al. ............... | 455/456.1 |

* cited by examiner

*Primary Examiner* — Jason Mattis
*Assistant Examiner* — Omer Mian

(57) ABSTRACT

Disclosed herein is a wireless location determination system and method.

A wireless location determination system of the present invention includes one or more location determination nodes (reception units) for calculating standard deviations of time intervals between pulses sequentially received from a location determination target, and estimating reliability values from the standard deviations. A location determination server receives messages, including the reliability values, from the location determination nodes, and obtains a location of the location determination target (transmission unit). Accordingly, the present invention can not only improve the resolution of location determination by correcting the distances between the location determination target and the respective location determination nodes, but also can easily observe the location determination performance of a relevant node by monitoring reliability values of the location determination nodes, and can regard the reliability values as measures for the observation of performance and the maintenance of location determination nodes.

8 Claims, 3 Drawing Sheets

WIRELESS LOCATION DETERMINATION SYSTEM AND METHOD

BACKGROUND OF THE INVENTION

1. Field of the Invention

The present invention relates generally to a wireless location determination system and method, and, more particularly, to a wireless location determination system and method, which can improve the precision and reliability of location determination of a target and can facilitate the performance observation and maintenance of a location determination system even if the hardware resources of the location determination system are not reinforced.

2. Description of the Related Art

Wireless location determination technology is a technology for measuring the location of a terminal in satellite navigation systems such as a Global Positioning System (GPS), or wireless communication systems such as Code Division Multiple Access (CDMA), Wireless Local Area Network (WLAN), Ultra Wideband (UWB) and Bluetooth systems. Alongside an increasing demand for location information, the fields of use of wireless location determination technology have recently been expanding.

In particular, recently, research into local area high-precision wireless location determination systems, which use Radio Frequency Identification (RFID), ultrasonic waves, infrared rays, or UWB, has been actively conducted. For example, there has been developed indoor location determination technology which enables the locations of users or objects to be detected even in a region which GPS satellite signals cannot reach, such as the inside of buildings. Further, research into technology for detecting the location of a terminal through the transmission/reception of radio signals between a sensor and the terminal has been widely conducted.

Generally, the motion trajectory of a terminal is divided into a section in which the terminal is moving at uniform velocity and a section in which the terminal is moving at predetermined acceleration. In these sections, when the same motion model as the terminal is set and the location of the model is measured by an indoor location determination system, mismatching occurs between the motion of the model and the motion of the terminal. As a result, a disparity appears between the location of the terminal estimated by the location determination system and the actual location of the terminal, thus greatly deteriorating the precision of location determination.

Further, in the case of technology for measuring the location of a terminal by transmitting or receiving radio signals between a sensor and the terminal, it is usually difficult to perform this measurement as it is performed under ideal conditions. Further, when signals are bypassed, reflected or refracted due to the clustering of obstacles, errors may be included to some degree due to various factors such as multi-propagation, synchronization errors and measurement errors, and, thus information about a measured location is incorrect.

Therefore, in order to improve the reliability and precision of location determination in such a wireless location determination system, there have been mainly proposed in the prior art the methods of enhancing hardware performance by, for example, increasing the bandwidth of pulse signals for location determination, reducing the jitter of the clock of a transmitter/receiver, or more minutely sampling received pulse signals. However, the enhancement of such hardware performance is not only inevitably accompanied by an increase in cost, but is also inappropriate for the utilization of existing systems that have been already manufactured.

SUMMARY OF THE INVENTION

Accordingly, the present invention has been made keeping in mind the above problems occurring in the prior art, and an object of the present invention is to provide a wireless location determination system and method, which can improve the reliability and precision of location determination by adding comparatively simple calculations without increasing the resources of a location determination system.

In accordance with an aspect of the present invention to accomplish the above object, there is provided a location determination system, comprising a tag which is a location determination target for generating and transmitting a plurality of pulses at regular time intervals; one or more nodes for sequentially receiving the pulses transmitted from the tag, calculating standard deviations of time intervals between the pulses received by the respective nodes and computing reliability values based on the standard deviations; and a location determination server for receiving messages including the reliability values from the respective nodes, and obtaining a location of the tag, thus not only improving the resolution of location determination by correcting the distance values between the location determination target and respective location determination nodes, but also enabling reliability values of the respective location determination nodes to be utilized both for observing the performance of the nodes and for maintaining the nodes by monitoring the reliability values of the respective location determination nodes.

In accordance with another aspect of the present invention, there is provided a wireless location determination method, comprising a first step of sequentially receiving a plurality of pulses that are transmitted from a location determination target at regular time intervals; and a second step of calculating standard deviations of time intervals between the received pulses and computing reliability values from the standard deviations, wherein a location of the location determination target is obtained by applying the reliability values to estimated distances to the location determination target.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
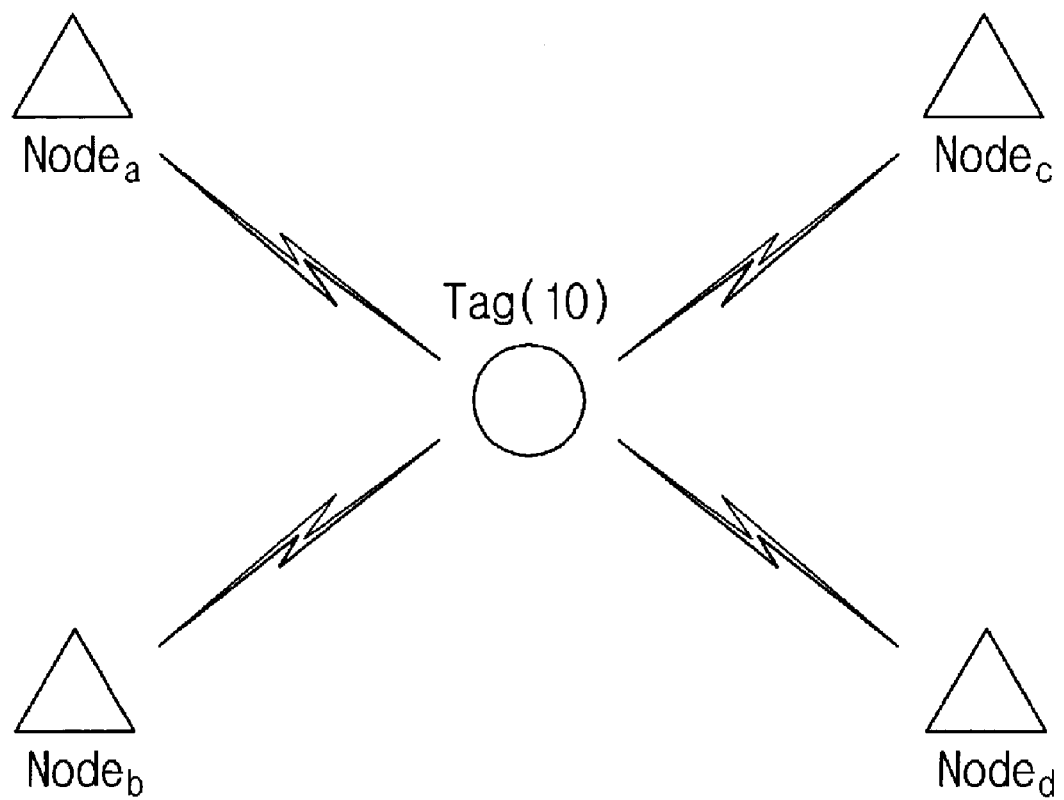
FIG. 1 is a schematic diagram briefly showing the construction of a wireless location determination system according to an embodiment of the present invention.

FIG. 1 is a schematic diagram briefly showing the construction of a wireless location determination system according to an embodiment of the present invention.

As shown in FIG. 1, a wireless location determination system for performing wireless location determination using pulse signals includes a tag 10 which is a location determination target for transmitting radio pulse signals, one or more nodes Node$_a$ to Node$_d$ arranged around the tag 10 and configured to receive the radio pulse signals transmitted from the tag 10, and a location determination server 20 configured to receive data from individual nodes and determine the location of the tag. The data received by the location determination server 20 from the nodes is data about the time at which each of the nodes receives a pulse train from the tag 10.

The one or more nodes Node$_a$ to Node$_d$ are each equipped with a function of wireless communication with the tag or the location determination server. The nodes may be implemented as GPS receivers, mobile communication terminals or base stations when the determination of a location is performed through a GPS or a mobile communication network, and may be implemented as terminals each equipped with a sensor or a receiver which receives pulse signals when the determination of a location is performed through Bluetooth, UWB or the like.

Location determination schemes using pulse signals may exploit the Time Of Arrival (TOA) of pulses between the tag 10 and each of the nodes Node$_a$ to Node$_d$, or the Time Difference Of Arrival (TDOA) indicating the difference in the arrival times of the pulses generated by the tag 10 among the nodes Node$_a$ to Node$_d$.

The wireless location determination system according to the present invention is configured to further compensate for errors in the TOA of pulses that may occur due to several factors by utilizing time intervals between the pulses sequentially received by each of the nodes Node$_a$ to Node$_d$, as well as the TOA or TDOA of pulses in each of the nodes Node$_a$ to Node$_d$, thus improving the reliability or precision of location determination.

Therefore, the wireless location determination system according to the present invention may be applied to both TOA and TDOA schemes, and may also be applied to a plurality of location determination schemes modified based on the TOA or TDOA scheme.

Figure 2A:
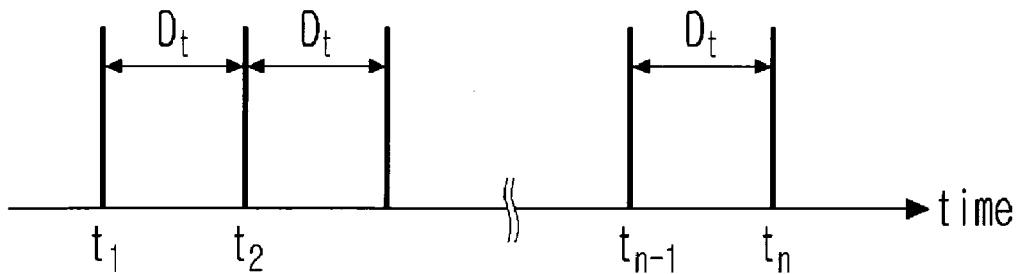
FIGS. 2A to 2C are graphs showing pulse trains received by respective nodes in the wireless location determination system according to the embodiment of the present invention.
Figure 2B:
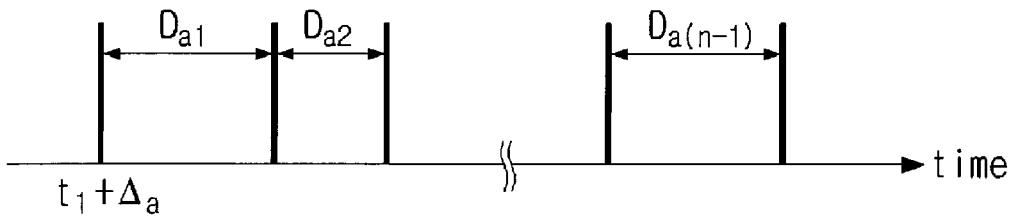
Figure 2C:
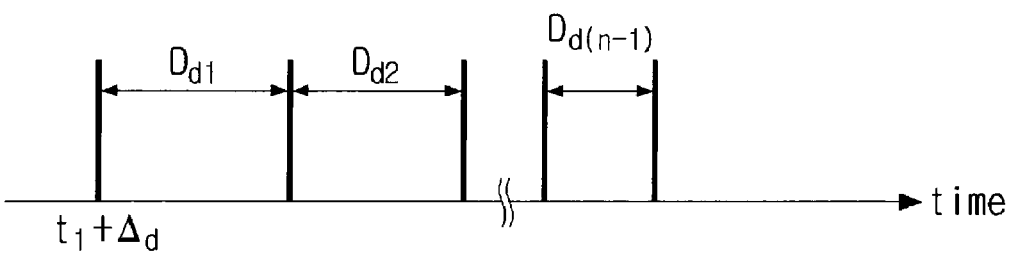

FIGS. 2A to 2C are graphs showing pulse trains received by respective nodes with respect to a plurality of pulse signals transmitted from the tag in the wireless location determination system according to the embodiment of the present invention. FIG. 2A illustrates a pulse train generated by the tag, FIG. 2B illustrates a pulse train received by a first node, and FIG. 2C illustrates a pulse train received by a fourth node.

As shown in FIG. 2A, the tag 10 sequentially generates N radio pulse signals for location determination at regular time intervals of D$_t$, and transmits the N pulse signals to individual nodes Node$_a$ to Node$_d$. Each of the nodes sequentially receives the pulse signals transmitted from the tag, but the nodes sequentially receive the pulse signals after predetermined time delays corresponding to the differences between the distances to the nodes.

By way of example, this operation is described below with reference to FIGS. 2B and 2C. The first node Node$_a$ starts to sequentially receive the N pulses transmitted from the tag 10 after a predetermined time delay Δa has elapsed from the time point at which a first pulse was transmitted from the tag 10, as shown in FIG. 2B. Similarly, the fourth node Node$_d$ also starts to sequentially receive the N pulses transmitted from the tag 10 after a predetermined time delay Δd has elapsed from the time point at which the first pulse was transmitted from the tag 10, as shown in FIG. 2C.

In this case, unlike the pulse train generated by the tag 10, time intervals between the pulses of the pulse train received by each of the nodes Node$_a$ to Node$_d$ may slightly vary due to the difference in Signal-to-Noise Ratio (SNR) attributable to the wireless channel environment or distance or variation in the hardware states of the node.

For example, as shown in FIG. 2A, the tag 10 generates the pulses of a pulse train at regular time intervals of D$_t$. However, as shown in FIG. 2B, time intervals between the pulses, sequentially received by the first node Node$_a$ from the tag 10, are D$_{a1}$, D$_{a2}$, . . . , D$_{a(n-1)}$, which may be identical to or different from each other. Similarly, as shown in FIG. 2C, time intervals between the pulses, sequentially received by the fourth node Node$_d$ from the tag 10, are D$_{d1}$, D$_{d2}$, . . . , D$_{d(n-1)}$, which may be identical to or different from each other.

As described above, such differences in the time intervals are caused by environmental factors such as Signal-to-Noise Ratio (SNR) attributable to the wireless channel environment or distances, or variation in the states of the hardware of the individual nodes. Accordingly, such differences are greatly related to reliability appearing at the time point at which location determination is performed. For example, when an abnormality suddenly occurs in the hardware of the first node Node$_a$ or when the channel environment of the first node Node$_a$ is suddenly degraded while the first node Node$_a$ receives a pulse train without causing large variation in the distance between the tag 10 and the first node Node$_a$, the first node Node$_a$ cannot normally receive the next pulse, and thus the time interval between the last pulse that has been previously received and the next pulse to be subsequently received may greatly increase. However, the distance between the tag and the first node Node$_a$ has been maintained at a relatively uniform level. As a result, when the time interval that can be determined to be an abnormal state at that time is applied to location determination without change, it can be considered that the precision of location determination is deteriorated to that extent, and the reliability of location determination is also deteriorated.

Further, it is considered that, as the time intervals between the pulses received by a relevant node are relatively uniform or approach the time interval between the pulses of the pulse train generated by the tag, the pulse signals received by the relevant node have higher reliability.

In consideration of this fact, the wireless location determination system according to the present invention can define reliability by obtaining a standard deviation of the time intervals between the pulses of a pulse train received by any k-th node. As described above, when the distances between the tag and the respective nodes are estimated through a TOA or TDOA scheme, the distances may be corrected in consideration of defined reliability values, thus more precisely determining the location of the tag.

Since the above-described TOA or TDOA scheme is a typical distance estimation scheme, a detailed description thereof is omitted in the present specification. The principal technical spirit of the present invention, that is, as a technology for correcting estimated distances through the calculation of reliability values, will be described in detail.

This technology will be described in detail. That is, a reliability value t(Node$_k$) in any k-th node may be defined by the following Equation (1) using a standard deviation σ(Node$_k$) of the time intervals {D$_{d1}$, D$_{d2}$, . . . , D$_{d(n-1)}$} between the pulses of the pulse train received by the k-th node.

$$t(\text{Node}_k) = 1/\sigma(\text{Node}_k) \quad (1)$$

As mentioned above, Equation (1) indicates the reliability calculated using a standard deviation of the time intervals between the pulses of the received pulse train, and may be modified by applying a statistical indicator other than the standard deviation, or another statistical indicator having indicative values together with the above statistical indicator.

Figure 3:
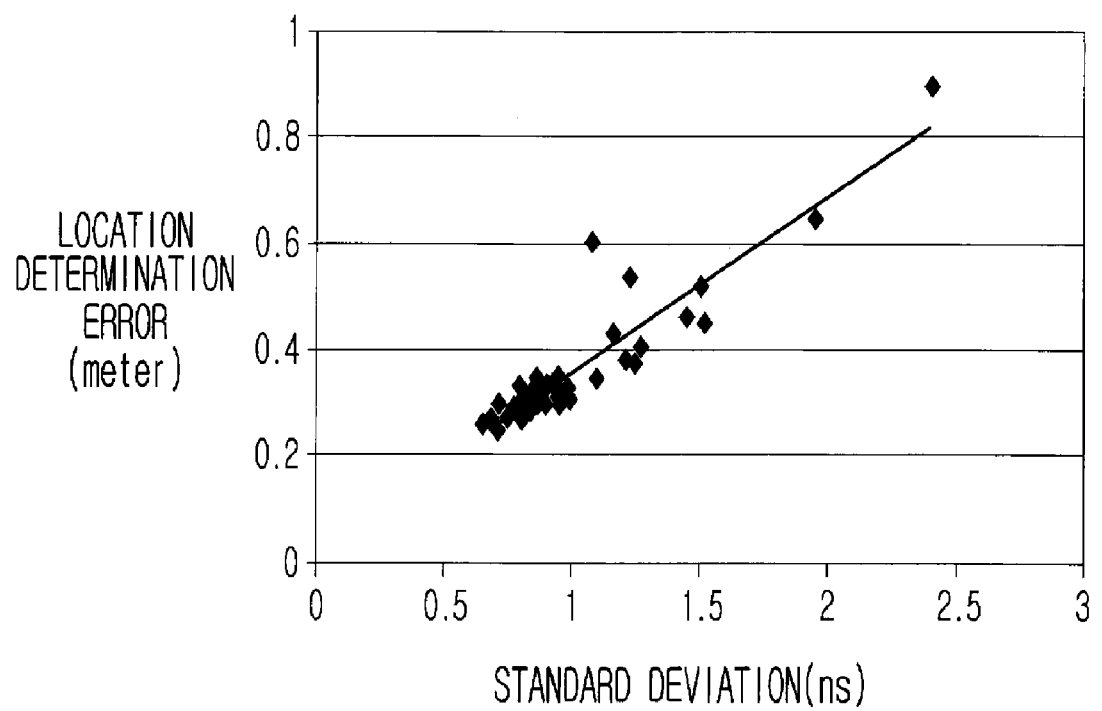
FIG. 3 is a correlation diagram showing the relationships between standard deviations of time intervals between pulses received by a relevant node and location determination errors actually measured by the node in the wireless location determination system according to the embodiment of the present invention.

FIG. 3 is a correlation diagram showing the relationships between standard deviations of time intervals between pulses received by any relevant node and location determination errors actually measured by the node in the wireless location determination system according to the embodiment of the present invention. As shown in FIG. 3, the standard deviations on an X axis and the location determination errors on a Y axis exhibit a proportional relationship, which shows that, as a standard deviation of the time intervals between the pulses received by the relevant node increases, and as a reliability value of the node decreases, location determination errors increase.

Meanwhile, when each node or the location determination server estimates and calculates the distance from the node to the tag on the basis of the time intervals between the received pulses, and the reliability of each node is individually calculated together with the distance, the location determination server performs two-dimensional wireless location determination by applying calculated reliability values to estimated distances received from the respective nodes.

For example, when a reliability value corresponding to a distance estimated by a specific node is remarkably low, the estimated distance is not used for two-dimensional location determination, and location determination may be performed using only the distance information estimated by the remaining nodes. In more detail, the distance estimated by a specific node, the reliability value of which is much lower than those of other nodes, may be expected to reflect a lot of error factors due to a wireless environment or an erroneous operation of detecting pulses in the relevant node. Accordingly, it may be preferable not to apply the distance estimated by that node, rather than to apply such an estimated distance in order to more precisely determine the location of the tag.

Further, if it is assumed that a reliability value currently being calculated by any k-th node and a distance value currently being estimated by the k-th node are $t_0(Node_k)$ and $p_0(Node_k)$, respectively, and a reliability value that has been previously calculated and a distance value that has been previously estimated are $t_{-1}(Node_k)$ and $p_{-1}(Node_k)$, respectively, the distance currently being estimated can be corrected by applying each reliability value to the following Equation (2).

$$p_0'(Node_k) = p_0(Node_k) * t_0(Node_k) + p_{-1}(Node_k) * t_{-1}(Node_k) \quad (2)$$

That is, as shown in Equation (2), the estimated distance can be more reliably calculated by multiplying the reliability values by the estimated distances as weights.

In addition to the above methods, when standard deviations $\sigma(Node_k)$ of the time intervals between the pulses are obtained for respective nodes, and an average of the time intervals between the pulses for all nodes is calculated, the intensity of noise, which reflects all the noise characteristics of channels and hardware performance at the time point at which the pulse train is received, can be determined. Therefore, when an adaptive filter having filter coefficients varying according to the intensity of noise is applied to the location determination server, more precise location determination can be performed.

Further, when, for a specific node, standard deviations $\sigma(Node_k)$ of the time intervals between received pulses are sequentially stored, compared and analyzed, the approximate location determination performance of the specific node can be detected. On the basis of the approximate location determination performance, whether the operation of the node is normal is determined, and thus the results of the determination can be utilized for the maintenance of the location determination system.

For example, since standard deviations of the time intervals between the pulses of a pulse train, received by each node from the tag, may reflect wireless channel environments or the hardware performance of the relevant node, as described above, the range of standard deviations indicating normal hardware performance can be computed. Therefore, a range of standard deviations, calculated when the relevant node is normally operated, is computed (or estimated) in advance, and is set as a reference range. When a standard deviation, calculated when the relevant node is actually operated, deviates from the reference range, it can be determined that the current operation of the relevant node is abnormal. If it is determined that the current operation of the relevant node is abnormal, a warning message for replacing or maintaining the relevant node can be generated. Accordingly, even if a user does not personally examine the performance of individual nodes, the monitoring of the nodes is possible, and the aging of hardware can be determined depending on the degree of low values which are exhibited even in the normal range.

In this case, the determination of normality/abnormality of the relevant node may be performed whenever standard deviation is calculated, or at regular cycles or periods.

In the above-described wireless location determination system according to the embodiment of the present invention, various operations such as operations of calculating standard deviations of the time intervals between received pulses, computing reliability values from the standard deviations, and utilizing the reliability values for estimating the location of the tag, and additionally utilizing the reliability values for the maintenance of the location determination system have been described as being performed by the location determination server by way of example in the present specification. However, the present invention is not limited to the above example, and the above operations may be performed by all nodes depending on various factors such as system resources or the efficiency of location determination, and may be divided and separately performed by the location determination server and each node depending on the circumstances.

As described above, although a wireless location determination system and method according to the present invention has been described with reference to the attached drawings, the present invention is not limited by the embodiments and drawings disclosed in the present specification. It is apparent to those skilled in the art that the technical spirit of the present invention, which is intended to improve the reliability of location determination by calculating reliability indicators using the time intervals between pulses received by the respective nodes and by applying the reliability indicators to the estimation of distances at the time of performing wireless location determination using pulses even if separate system resources are not added, or is intended to utilize the reliability indicators for the maintenance of the system, will be easily modified by those skilled in the art within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims even if separate system resources are added.

What is claimed is:

1. A wireless location determination system, comprising: a location determination target configured to generate and transmit a pulse train, wherein the pulse train comprises a plurality of pulses and wherein there are regular time intervals between the transmitted pulses;
   a plurality of nodes configured to respectively receive the pulse train transmitted from the location determination target, calculate respective standard deviations of time intervals between the received pulses corresponding to the regular time intervals between the transmitted pulses and compute respective reliability values based on the respective standard deviations; and
   a location determination server configured to receive messages including the respective reliability values from the respective nodes, and obtaining determine a location of the location determination target,
   wherein the location determination server is configured to calculate distances between the tag and the respective nodes based upon times of arrival of pulses at the respective nodes, and determine the location of the location determination target by applying the respective reliability values to the calculated distances, and
   wherein the messages further include the times of arrival of the initial pulses at the respective nodes.

2. The wireless location determination system according to claim 1, wherein the respective reliability values are calculated by the following equation:

$$t(\text{Node}_k) = 1/\sigma(\text{Node}_k)$$

where $t(\text{Node}_k)$ is the respective reliability value of a node k, and $\sigma(\text{Node}_k)$ is the respective standard deviation of time intervals between pulses received by the node k.

3. The wireless location determination method according to claim 1, wherein the location determination server is configured to calculate the estimated distances between the location determination target and the respective nodes using a Time Of Arrival (TOA) scheme or a Time Difference Of Arrival (TDOA) scheme.

4. The wireless location determination system according to claim 1, wherein the location determination server is configured to compute reference ranges of the respective standard deviations calculated in a normal operation state of the respective nodes, and determine that an abnormality has occurred in a relevant node when the respective standard deviation of the relevant node deviates from its corresponding reference range.

5. A wireless location determination method, comprising:
   receiving, by a plurality of nodes, a pulse train that is transmitted from a location determination target, wherein the pulse train is generated by the location determination target and comprises a plurality of pulses, and wherein there are regular time intervals between the pulses; and
   calculating, by each of the a plurality of nodes, respective standard deviations of time intervals between the received pulses corresponding to the regular time intervals between the transmitted pulses and computing, by each of the a plurality of nodes, respective reliability values from the respective standard deviations; and
   calculating, by each of the a plurality of nodes, estimated distances to the location determination target using times of arrival of the pulses of the pulse train, and applying, by a location determination server, the respective reliability values to the estimated distances to estimate the location of the location determination target.

6. The wireless location determination method according to claim 5, wherein the respective reliability values are calculated by the following equation:

$$t(\text{Node}_k) = 1/\sigma(\text{Node}_k)$$

where $t(\text{Node}_k)$ is the respective reliability value of a node k, and $\sigma(\text{Node}_k)$ is the respective standard deviation of time intervals between pulses received by the node k.

7. The wireless location determination method according to claim 5, wherein the calculating of the estimated distances comprises calculating the estimated distances between the location determination target and the respective nodes using a Time Of Arrival (TOA) scheme or a Time Difference Of Arrival (TDOA) scheme.

8. The wireless location determination method according to claim 5, further comprising:
   computing, by the location determination server, reference ranges of the respective standard deviations calculated in a normal operation state of the respective nodes, and
   determining, by the location determination server, that an abnormality has occurred in a relevant node when the respective standard deviation of the relevant node deviates from its corresponding reference range.

* * * * *